US006286009B1

(12) United States Patent
Mattioli, Jr. et al.

(10) Patent No.: US 6,286,009 B1
(45) Date of Patent: Sep. 4, 2001

(54) PLATFORM INDEPENDENT RATE DATA AND METHOD OF CALCULATING A RATE FOR A CARRIER MANAGER USING PLATFORM INDEPENDENT RATE DATA

(75) Inventors: John R. Mattioli, Jr., Hamden; Jacques Hasbani, Bethel; Terri A. Carroll, Milford; Angela M. Njo, Shelton; Edward M. Rauh, West Haven; Stephen C. Nunnally, Bridgewater, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/209,715

(22) Filed: Dec. 11, 1998

(51) Int. Cl.[7] .......... G06F 12/30
(52) U.S. Cl. .......... 707/102; 705/401
(58) Field of Search .......... 707/102; 705/401

(56) References Cited

U.S. PATENT DOCUMENTS 4,713,761 * 12/1987 Sharpe et al. .......... 705/30
5,222,018 * 6/1993 Sharpe et al. .......... 705/30
6,078,889 * 6/2000 Boucher et al. .......... 705/1
6,216,265 * 4/2001 Roop et al. .......... 725/54

* cited by examiner

*Primary Examiner*—Wayne Amsbury
(74) *Attorney, Agent, or Firm*—Alberta A. Vitale; Michael E. Melton

(57) ABSTRACT

The present invention is directed to a platform independent rate data structure for representing a rate chart for a carrier manager system and a method of calculating a rate using the platform independent rate data structure and carrier rate calculation software of the carrier manager system. The rate data structure represents the rate chart, and comprises a header and a data area. The header contains information which describes the content of the rate data structure. The data area may comprise a collection of expressions and a collection of subtables. The expressions are mathematical formulas representing rates. The subtables are formats representing rate chart data. A rate chart may be represented by a combination of subtables and/or expressions in a rate data structure. The amount of space required to represent the rate chart is reduced by the rate data structure representation of the present invention. The rate data structure representation is also platform independent.

31 Claims, 12 Drawing Sheets

```
RATE DATA STRUCTURE                                  ←—310
        RATE DATA STRUCTURE HEADER ←—312
                NUMBER OF SUBTABLES - 1
                NUMBER OF EXPRESSIONS  0
                EXPECTED INPUT PARAMETERS -1 (WEIGHT)
                ROUNDING INSTRUCTIONS - ROUNDUP
        COLLECTION OF EXPRESSIONS - NONE    ←—314
        COLLECTION OF SUBTABLES - 1         ←—316
                 SUBTABLE HEADER            ←—317
                          FORMAT INDICATOR - FORMAT ONE
                          DECIMAL POSITION - 2
                          VALUE USAGE - IN USE
                          COMPARISON OPERATOR - EQUALS/=
                          MINIMUM CHARGE - NONE
                          MAXIMUM CHARGE - NONE
                          VALUE SIZE - 2
                 KEY OR PARAMETER CONTROL BLOCK          ←—318
                          NUMBER OF SEGMENTS - 2
                          SEGMENTS BLOCKS - SEGMENT 1 (LINEAR), SEGMENT 2 (LINEAR)
                          ENTRY SIZE (# OF BYTES FOR EACH SEGMENT) - 1
                          SEGMENT 1            ←—320
                                  NUMBER OF VCB ENTRIES - 10
                                  MAX PARAMETER VALUES - 10
                                  SEGMENT VCB - LINEAR
                                          NUMBER OF ENTRIES - 2
                                          SEGMENT TYPE - LINEAR
                                          START - 1
                                          INCREMENT - 1
                          SEGMENT 2
                                  NUMBER OF VCB ENTRIES - 5
                                  MAX PARAMETER VALUES - 20
                                  SEGMENT VCB - LINEAR
                                          NUMBER OF ENTRIES - 2
                                          SEGMENT TYPE - LINEAR
                                          START - 12
                                          INCREMENT - 2
                VALUE CONTROL BLOCK - NONLINEAR         ←—319
                        NUMBER OF ENTRIES - 15
                        VCB TYPE - NONLINEAR
                        ENTRIES:25 35 40 48 53 60 70 81 93 99 125 145 165 195 200
```

FIG. 2A

300

RATE CHART

| WEIGHT | RATE |
|---|---|
| 1 | .25 |
| 2 | .35 |
| 3 | .40 |
| 4 | .48 |
| 5 | .53 |
| 6 | .60 |
| 7 | .70 |
| 8 | .81 |
| 9 | .93 |
| 10 | .99 |
| 12 | 1.25 |
| 14 | 1.45 |
| 16 | 1.65 |
| 18 | 1.95 |
| 20 | 2.0 |

FIG. 2B

```
RATE DATA STRUCTURE                                  310
    RATE DATA STRUCTURE HEADER   312
        NUMBER OF SUBTABLES - 1
        NUMBER OF EXPRESSIONS  0
        EXPECTED INPUT PARAMETERS -1 (WEIGHT)
        ROUNDING INSTRUCTIONS - ROUNDUP
    COLLECTION OF EXPRESSIONS - NONE      314
    COLLECTION OF SUBTABLES - 1           316
        SUBTABLE HEADER                   317
            FORMAT INDICATOR - FORMAT ONE
            DECIMAL POSITION - 2
            VALUE USAGE - IN USE
            COMPARISON OPERATOR - EQUALS/=
            MINIMUM CHARGE - NONE
            MAXIMUM CHARGE - NONE
            VALUE SIZE - 2
        KEY OR PARAMETER CONTROL BLOCK              318
            NUMBER OF SEGMENTS - 2
            SEGMENTS BLOCKS - SEGMENT 1 (LINEAR), SEGMENT 2 (LINEAR)
            ENTRY SIZE (# OF BYTES FOR EACH SEGMENT) - 1
            SEGMENT 1             320
                NUMBER OF VCB ENTRIES - 10
                MAX PARAMETER VALUES - 10
                SEGMENT VCB - LINEAR
                    NUMBER OF ENTRIES - 2
                    SEGMENT TYPE - LINEAR
                    START - 1
                    INCREMENT - 1
            SEGMENT 2
                NUMBER OF VCB ENTRIES - 5
                MAX PARAMETER VALUES - 20
                SEGMENT VCB - LINEAR
                    NUMBER OF ENTRIES - 2
                    SEGMENT TYPE - LINEAR
                    START - 12
                    INCREMENT - 2
        VALUE CONTROL BLOCK - NONLINEAR             319
            NUMBER OF ENTRIES - 15
            VCB TYPE - NONLINEAR
            ENTRIES:25 35 40 48 53 60 70 81 93 99 125 145 165 195 200
```

PLATFORM INDEPENDENT RATE DATA AND METHOD OF CALCULATING A RATE FOR A CARRIER MANAGER USING PLATFORM INDEPENDENT RATE DATA

FIELD OF THE INVENTION

The present invention relates to postage value computation generally and in particular the arrangement, storage and computation of postage rate information to be applied to parcels, letters, or similar items to be transported by a carrier as selected from among a set of carriers.

BACKGROUND OF THE INVENTION

The ability of shippers to send parcels from the loading dock to their final destinations in shorter time spans and at less cost has increased in recent years. The growth of the overnight carriers and two- and three- day delivery carriers has created vast fleets of transport vehicles representing each of the many transportation modes. These, in turn, benefit from efficient manifesting and logistical accounting.

Carriers are companies that provide services to their clients for facilitating the transport of letters, parcels, bulk goods, or anything that can be shipped by public, common, or specialized transport means. There is a great variety in the types and scope of services that can be provided by the individual carrier.

The growth of shipping has fueled the drive for efficiencies that each of the carriers has been developing. Technological advances and better methods of doing business have, in turn, spurred greater demand for carrier services. The net result is that the volume of parcels being shipped has continued to spiral upward.

Systems and methods have been proposed to more efficiently handle the increased volume of parcels and more efficiently choose the most cost-effective among the many carrier services that are available. Individual carriers have introduced systems and methods that are targeted to that particular carrier only. Shippers have looked for systems that provide them with a means to rate or service shop; these systems are called carrier manager systems. The object of all of these systems has been to send a parcel on from point A to point B, efficiently.

Carrier Management Systems, such as the E900 Carrier Management System, sold by Pitney Bowes Inc., the assignee of the present application, generally includes as peripheral elements: a microprocessor; keyboard; monitor; platform scale; printer; and, possibly, a scanner. The E900 system automatically prepares documents for shipping articles to any desired number of different receivers by any selected carrier or mode. The E900 carrier Management System data files are not platform independent, and therefore data files are prepared for the E900 system to work with specific operating systems. Each operating system or platform requires different data file structure, and the data files also require large amounts of memory.

The ability of carriers to respond to shippers' needs is based on the individual carrier's capacity. Carrier capacity is the space that is available at any given time in the vehicle/container representing the carrier's mode of transport. For every shipment that leaves the dock of a shipper bound for a particular destination, a carrier makes available a mode of transportation. Each mode of transportation has its unique vehicle for transport; such as freight cars via rail, containers via ship, cubic inches via truck, etc. This capacity must be rated in some manner according to the rating data developed and promulgated by each of the carriers in the form of rate charts.

Each carrier has its own rate structure for service charges. Typically, rate structures are complex and involve a variety of factors; these factors may include: distance from origin to destination; weight rating; dimensional rating; service rating; and mode of transport. Thus, the business rules for rating items to be transported vary greatly from carrier to carrier. Rating calculations may shift over time, depending upon shifts in the business or carrier climate. Accordingly, it is desirable to provide a mechanism for updating how carrier rates are calculated. Additionally, it is desirable to provide a mechanism for storing rate data with a minimal size so that the data can be easily transmitted via a modem or intemet connection.

The prior art works well in embedded systems or in an intranet environment where the systems administrator or systems user has some measure of control over the operating system platforms that store data, apply rating charges, and store the data within a data center. In other systems that are not embedded, where there is no control over the operating system platforms, the prior art does not work as well because of its platform dependency. The advancement of data processing systems and the ability of varying logistics services applications to require data sharing for the purposes of optimizing logistics operations has created a definitive need for systems of varying architecture and with varying operating systems, to be able to use data of a single configuration.

As the capabilities of data processing systems has grown, so too have the requirements that are tasked to these systems. Greater speed has given rise to more detail oriented applications, greater memory capability has made memory-intensive applications more attractive, and detailed applications have lead to more wide-spread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms, to be able to communicate without extensive system or file modification.

The use of the Internet for transfer of data provides a universal means of accessing new data for downloading. However, the transfer can take large amount of time, due to the sizes of the data files and the communications time such as, for example, by 56 k baud rate modem over a telephone line. Therefore, there is a need for data efficiency by creating smaller data files that are downloaded in less time than prior art data files. The smaller data file sizes are also advantageous since they take up less memory, which is helpful in today's environment where greater memory is available but is competed for by many large applications and data files.

Thus, one of the problems of the prior art is that data files are platform-dependent and updating data requires updating numerous data files configured for various platforms. Another problem of the prior art is that large data files sizes require longer transfer times. Another problem of the prior art is that larger data files take up large amounts of memory. Another problem of the prior art has been that updating data files requires updating of numerous different files configured for various platforms.

SUMMARY OF THE INVENTION

This invention overcomes the disadvantages of the prior art by providing platform independence and smaller data size, which are desirable when a rate change is required because they simplify rate change procedure by allowing for maintenance of a single set of rate data and by allowing for quicker transfer of data files, in a general aspect, the present invention is directed to a data structure for storing carrier rate chart information comprising a data structure header and a data structure data area. The data structure is platform independent and the data structure header and data structure data area facilitate the smaller size of the carrier rate chart data file. The platform independent data structure can be read by a carrier manager system using any one of a number of operating systems, such as, for example, Microsoft Windows™ 3.1, Windows98™, or Windows NT™, IBM's OS/2™ and the UNIX™.

The data structure header describes the content of the data structure including a map of subtables containing rate data. The data structure data area represents the actual rating data which makes up the rate chart being represented by the data structure.

The data area contains information about the values required in order to represent a particular rate chart. The data structure data area comprises a collection of expressions and a collection of subtables. Since a single rate chart an vary greatly, dependent on, for example, a given weight range, several data schemes can be used to represent the different rate data of a given rate chart. The subtables each can implement a different data scheme. Expressions, such as mathematical expressions, can also represent data schemes. Expressions can contain a sequence of operators and operands strung together in a logical way to represent a particular data scheme. The expressions and subtables generally take up less memory than prior art data configurations. The data area configuration is platform independent.

A carrier manager system with carrier rate calculation software is used to read the data structure of the present invention and calculate a rate. A user inputs parameters to the carrier manager system, such as, for example, weight, zone and shipping date. A data structure representing an appropriate rate chart is used by the rate calculation software. Depending upon the input parameters, one of several data structures is chosen. The data structures can contain subtables which are Format Zero subtables, Format One subtables, Format Two subtables, or any combination of format subtables needed to represent a given rate chart. For explanation purposes, the examples set out below contain subtables with only one format. A Format Zero subtable is used primarily to represent fixed rate values. A Format One subtable is used to calculate the rate based on one input parameter, such as, for example, weight, dollar amount, or zone. A Format Two data subtables is used to calculate the rate based on two input parameters, such as, for example, weight and zone and number of pieces. Each rate data structure presents the data in a reduced size and in a platform independent manner.

In another aspect, the device of the present invention is directed to a method of calculating a rate using the data structure of the present invention. The method generally comprises the steps of: inputting the name of a data structure representing a rate chart, the date of shipment and input parameters, retrieving the rate data structure, and reading and decoding the rate data structure header. The input parameters are checked for propriety and rounded according to rounding instructions. The subtable header is read and decoded and segments of a parameter control data block are searched for information corresponding to the input parameters. The rate is calculated using this information and a decimal point is inserted into the rate. The rate can also be checked against a minimum and/or maximum value for the rate data structure. The rate is then sent to the carrier manager system where it can be, for example, outputted, or saved. Since instructions for reading the data structure and calculating a rate are in the data structure, the data structure is platform independent.

The platform independent data structure of the present invention requires less space in memory. It also can be maintained more easily and updated by a simplified rate change procedure. Other advantages of the invention will, in part, be obvious and will, in part, be apparent from the specification. The aforementioned advantages are illustrative of the advantages of the various embodiments of the present invention.

BRIEF DESCRIPTION OF THE DRAWINGS

FIG. 2*a* is an example of a rate chart in tabular form.

FIG. 2*b* is an exemplary outline representation of a rate data structure corresponding to the tabular rate chart of FIG. 2*a*.

DETAILED DESCRIPTION OF THE PRESENT INVENTION

Figure 1:
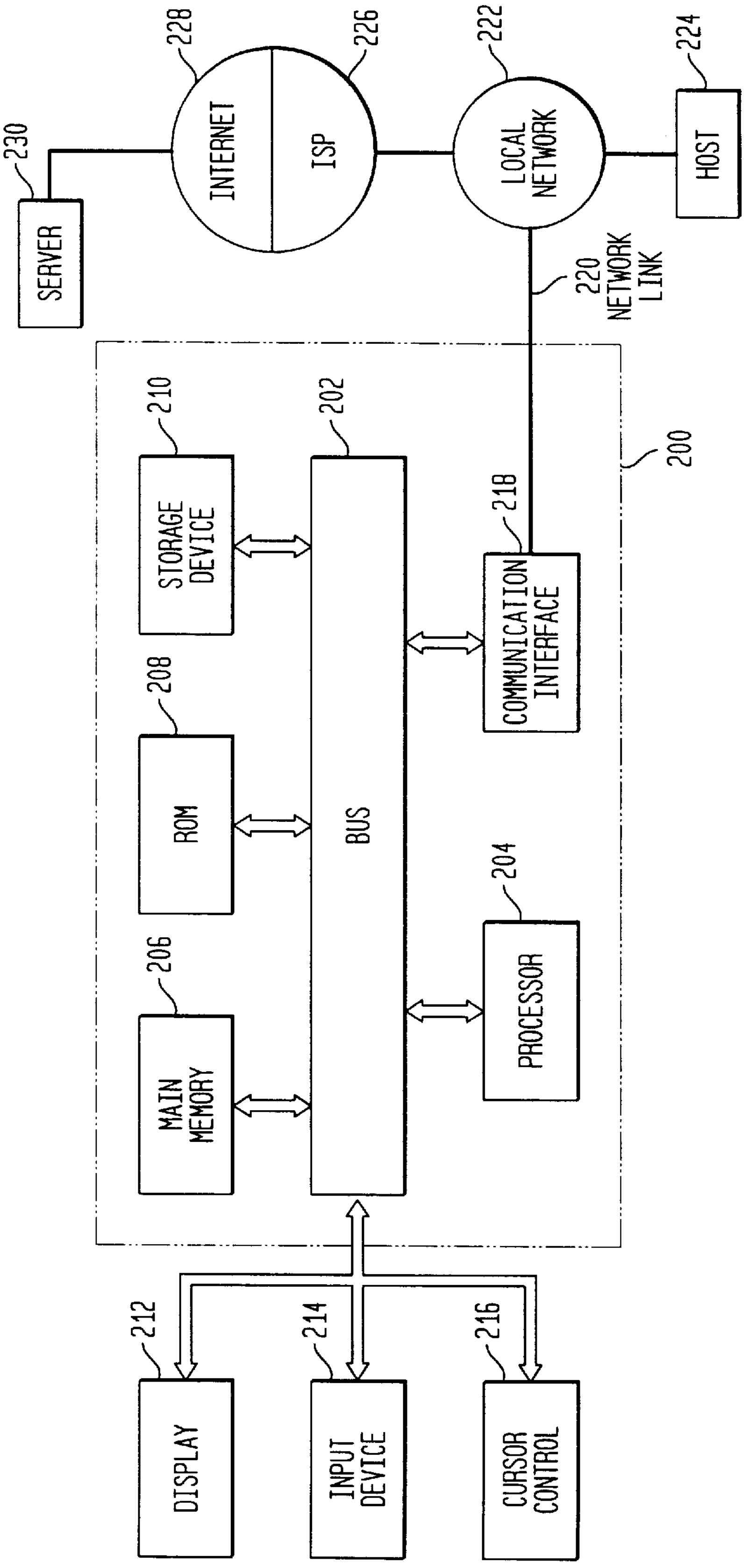
FIG. 1 is a block diagram of a computer system that can be used to implement the present invention.

In describing the preferred embodiment of the present invention, reference will be made herein to FIGS. 1–7 of the drawings in which like numerals refer to like features of the invention. Features of the invention are not necessarily shown to scale in the drawings.

Hardware Overview

FIG. 1 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. Common examples of computer system 200 include personal computers, workstations, minicomputers, servers, and mainframes.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212 through bus 202. This input device typically has two degrees of freedom in two axes, a first axis (e.g., x) and a second axis (e.g., y), that allows the device to specify positions in a plane.

The present invention is related to the use of computer system 200 for rating items for carriers. According to one embodiment of the invention, rating items for carriers is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The computer system 200 may be operated by a user, for example, sitting at a desk with a keyboard as an input device 214, a mouse as a cursor device 216, and a monitor as a display device 212. The user types commands through the keyboard or clicks on icons displayed on the monitor with the mouse to execute instructions that rate a package or other item. The results of rating the item may, for example, be displayed to the user or saved by the carrier manager system to a file in storage device 210 for use by other programs, e.g., an application to print a bill of lading through a printer or apply postage through a specialized peripheral device coupled to bus 202.

The term "computer-readable medium". as used herein, refers to any medium that participates in providing instructions to processor 204 for execution. Such a medium may take many forms, including but not limited to, non-volatile media, volatile media, and transmission media. Non-volatile media include, for example, optical or magnetic disks, such as storage device 210. Volatile media include dynamic memory, such as main memory 206. Transmission media include coaxial cables, copper wire and fiber optics, including the wires that comprise bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210, either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network, now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for rating items for carriers as described herein.

The received code may be executed by processor 204 as it is received, and/or stored in storage device 210, or other non-volatile storage for later execution. In this manner, computer system 200 may obtain application code in the form of a carrier wave.

Introduction to Rate Data Structures

FIG. 2*a* is a block diagram illustrating an exemplary tabular rate chart 300 and FIG. 2*b* is an outline representation of a rate data structure 310 of the present invention, corresponding to the tabular rate chart 300. Rate data will be described by this corresponding terminology as a rate chart or as a rate data structure of the present invention.

Figure 3A:
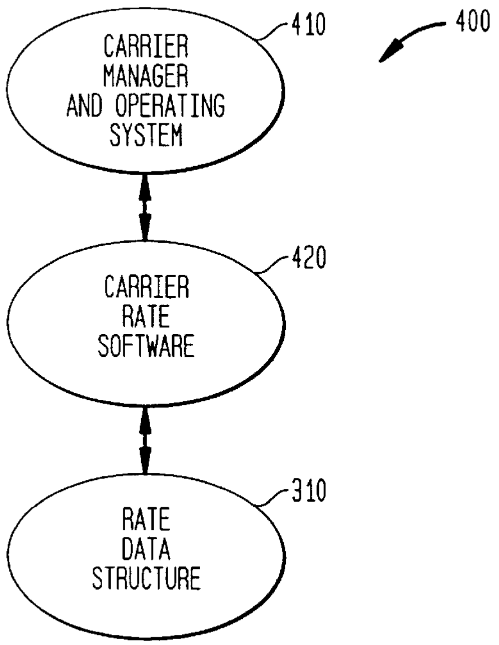
FIG. 3*a* is a block diagram of a system according to one embodiment of the present invention.
Figure 3B:
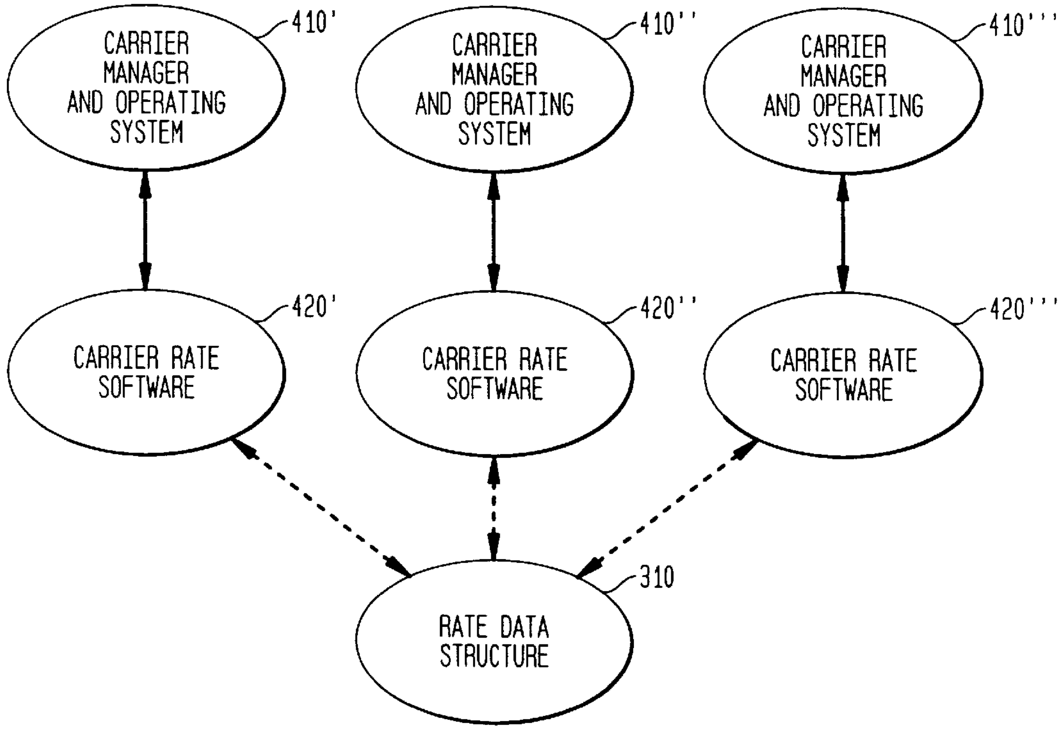
FIG. 3*b* is a block diagram of multiple systems, such as the system of FIG. 3*a* illustrating that one set of platform independent data is appropriate for all systems.

FIG. 3*a* illustrates a carrier manager system 410 with an operating system, an associated carrier rate software 420 and data structure 310. This is a typical configuration for storing the rate data structure and performing the rate calculation of the method of the present invention. FIG. 3*b* illustrates several carrier manager systems 410', 410'' and 410''', each with its respective operating system, with carrier rate calculation software 420', 420'' and 420''' respectively. Each carrier manager system can use the rate data structure 310 and can be implemented on a computer system, such as for example, the computer system illustrated in FIG. 1 and described herein above. In a preferred embodiment, logistics system 400 is a carrier manager system running on a personal computer or workstation running an operating system, such as, for example, a windowing operating system such as, Microsoft Windows™ 3.1, Windows95™, or Windows NT™, IBM's OS/2™ and the UNIX™ operating system running an X-Windows server. Carrier rate calculation software is associated with the carrier manager system. One platform independent rate data structure 310 may be used in any of the carrier manager systems, without requiring specific configuration for use with a particular operating system. The rate data structure 310 allows storage of the rate chart 300 in an application independent method thereby simplifying rate change procedure and allows for maintenance of a single set of rate data.

Rate Data Structures

The platform independent nature of the rate data structure 310 is achieved by providing a carrier rate chart represented by various storage schemes in a data structure. The present invention uses numerous schemes for storing carrier rates and associated parameters. The rate data structure is a collection of the data for computing a rate, including information about the data and the format of the data in the rate data structure. Since a single rate chart 300 can contain rates which vary greatly (for example, rates within the rate chart may vary greatly over the range of weight or other parameter (s) such as zone, number of pieces and dollar amount in the rate chart), several schemes may be used in the rate data structure 310 to represent the rate chart 300. Additionally, mathematical expressions may be used to represent all or a portion of the rate chart 300 in the rate data structure 310. Each section of the rate data structure 310 that implements a particular scheme is called a subtable. The rate data structure 310 can contain a collection of subtables as well as a collection of expressions. Each subtable implements a different data scheme, therefore, software utilizing the rate charts of the present invention can flexibly vary data retrieval methods during the computation of a single charge.

In the preferred embodiment, for example, as illustrated if FIG. 2*b*, a representation of a carrier rate chart 300 is stored in the data structure 310. The rate data structure comprises a header 312 containing information about the rate data structure and information about the functions of the rate data structure, the collection of expressions, and the collection of subtables. Instructions regarding the rounding of input parameters are also stored in the data structure.

The rate data structure header 312 comprises several indicators, including a number of subtables indicator indicating the number of subtables in the rate data structure, a number of expressions indicator indicating the number of expressions present in the data structure and an expected number of keys or input parameters indicator. The information in the rate data structure header will vary in accordance with the rate data stored in the data structure. The examples set forth, infra, illustrate several variations. The expected input parameters indicator checks to see if the input data and input parameters represent the same number and type of data as that built into the rate data structure which therefore improves reliability. The system checks to make sure that inputs required for computation of a rate are provided and unnecessary information is sorted out.

When any portion of a rate chart can be expressed as a mathematical formula or formulae, the collection of expressions portion of the data structure comprises the formula or formulae. The collection of subtables 316 comprises the subtables needed for representing rate data in the rate data structure. Each subtable comprises a subtable header 317, a key or parameter control data block 318 and a value control data block 319. Some subtables may also comprise additional key or parameter control data blocks, as needed, to represent a particular rate chart. The information and format of the parameter control data block can vary. In the collection of expressions, formulae are represented using a sequence of operators and operands strung together in a logical way so as to conform to carrier rating rules. In addition to standard mathematical operators, constants, minima and maxima can be defined. Additionally, rounding operations can be performed. The expression data allows further control over data size and decimal precision.

Each subtable header 317 comprises a format indicator, a decimal position indicator, a value usage and value size indicator, a comparison operator and minimum and maximum charge indicators. At a subtable level, minima and maxima can be applied to ensure that a calculated rate falls within a given range. Application of minima and maxima are controlled by flags in the data. During a search for appropriate rate data, the necessity for an input parameter lookup, type of input parameter lookup and number of input parameter lookups is determined. Preferably, Binary Coded Decimal (BCD) numbers are used in comparison operations during lookup to improve accuracy. However, other number representations such as, but not limited to, ASCII can be used. Comparison operators allow the rate calculation software to search for key values that have a logical relationship to input parameters.

Each key control data block 318 comprises a number of segments indicator for indicating the number of segments of parameter information that are contained in the subtable, one or more segments containing key or parameter information, a segment flag indicating the linearity of the data contained in the segment and a size of segment indicator indicating the size of the segment in number of bytes.

Each segment 320 of parameter information comprises a number of entries indicator indicating a number of entries in the segment, a maximum number indicator indicating the maximum value of the entries in the segment and a segment value control data block (VCB) comprising segment parameter data information.

The segment value control data block parameter information comprises a number of VCB entries indicator, indicating the number of entries in the segment value control data block and a segment flag, indicating the linearity of entries in the segment value control data block. In one embodiment, where value data is linear, the segment value control data block may also comprise a start value, indicating the starting value of the parameter information and an increment indicator, indicating the increment of parameter information entries from the start value, till in yet another embodiment, where value data is nonlinear, the segment value control data block may also comprise a set of entries where the number of entries in the set is equal to the number of entries indicator in the segment value control data block parameter data.

Each subtable value control data block 319 comprises a number of entries indicator indicating the number of entries in the subtable value control data block and a segment flag indicating the linearity of the entries in the subtable value control data block. In one embodiment, where value data is linear, the subtable value control data block 319 comprises a start value indicating the starting value of entries in the subtable value control data block and an increment indicator indicating the increment of parameter information from the start value. Still in yet in another embodiment, where value data is nonlinear, the subtable value control data block 319 may also comprise a set of entries where the number of entries in the set is equal to the number of entries indicator in the subtable value control data block.

In embodiments of the present invention which contain Format Two subtables, explained infra, the subtables 316 also comprise corresponding parameter control data blocks comprising a set of values corresponding to another input parameter and a value string containing rate mantissas corresponding to the other input parameters.

The values of the various elements of the data structure 310 vary depending upon type of rate chart that is being represented by the data structure. Any one of several types of rate charts can be represented by a data structure. A fixed rate rate chart is one of the simplest types of rate charts. The fixed rate rate chart is represented by a rate data structure with a Format Zero subtable. A rate chart containing rates and one parameter is represented by a rate data structure with a Format One subtable. A rate chart containing rates and two parameters is represented by a rate data structure with a Format Two subtable. The rate data structure can have several subtables with various formats. Rate data structures with Format Zero, Format One, and/or Format Two subtables can also include mathematical expressions for representing all or part of the rate chart. Each of the subtable formats will be described in the examples below.

The data structures are constructed to minimize data size and maximize computational accuracy. Both data size and decimal precision are controlled using flags in the data. The size of parameter and data values are independently controllable and may vary from one subtable to the next. It is preferred that numeric values be stored in Binary Coded Decimal which improves the accuracy of mathematical computations. However, one of ordinary skill in the art would understand that numeric values could be stored in other formats. The data structure contains information about the values needed in order to use a given rate data structure. This information ensures that the carrier rate calculation software 410 that reads the rate data structure is supplied with the needed parameters for using the rate data structure and that the parameters are within the rate data structure limits.

The carrier rate calculation software 410 removes the application programmer from the intricacies of rate computations. Rate calculation information is packaged into a carrier rate calculation software 410 component with a simple programming interface. Intemally, the carrier rate computation software retrieves all rate data and rating related formulae from the carrier-independent and platform-independent rate data structure 310. The rate computation is handled within the carrier rate computation software 410.

Two types of input values are accepted as inputs: parameter or key values (for data lookup) and data values (for use in mathematical expressions). These data can represent any type of numeric value (typically, monetary, weight, number of pieces, minimum charge, incremental charge, etc.). The carrier rate calculation method generates several types of outputs including a rate, the actual parameter values used to generate the rate, and flags to indicate application of minimum or maximum rates. The rate computation method is adaptable to carrier requirements since parameters and parameter information can be varied.

BCD is also preferred for retrieval of raw data from a storage medium. Upon retrieving raw data numbers, post-processing operations can take place. Retrieved raw data can be processed by a built-in expression handler or subjected to minimum or maximum value criteria. If necessary, both formula and minimum/maximum criteria can be applied.

Key and rate data are preferably operated upon in BCD format. However, other formats could be used. The size and decimal placement of key data and rate data are controlled independently. This dramatically reduces platform dependencies and increases processing accuracy.

Format Zero Data Structure

A rate data structure with a Format Zero subtable represents a flat rate rate chart. For example, rate chart A0 is represented by data structure, B0, show for illustration purposes in outline format. The rate data structure with the Fomat Zero subtable of Table B0 represents a rate chart of Table A0 with a $5 flat rate for any weight item, and comprises the following information (parentheticals in this description refer to Table B0): a data structure header (I) indicating that the data structure contains one Format Zero subtable (I. A.), a number of mathematical expressions indicator (I. B) indicating that the data structure contains no expressions, information regarding the number and type of expected input parameters (I. C) corresponding to the rate data structure subtable, in this example, an indicator indicating that one input parameter, weight, would be expected, and a subtable (III). The input parameter would be rounded according to rounding instructions (I. D) in the header. The subtable comprises a subtable format indicator set to Format Zero, a number of entries indicator set to 1, (III. A.2) information regarding decimal placement in a rate (III. A.3), for example, two places to the left in a rate mantissa, entry usage and entry size information (III. A.4 of III. A.5), an entry representing the rate mantissa and corresponding to the entry usage and entry size information contained in the subtable header. The entry usage and entry size information contains information regarding parameters, rate mantissas, maximum charge and minimum charge. The entry usage information indicates whether a value corresponding to a parameter, a rate mantissa or a maximum or minimum charge is present in the subtable. The entry size information contains a value for each entry which was indicated as used by the entry usage information indicators. In the example of the $5.00 flat rate data structure, there would be no maximum or minimum rates, nor would their be any indicators with respect to any other parameters, since the only parameter in the example is weight. Tables A0 contains an example of $5.00 flat rate rate chart while Table B0 contains an illistation of a data structure in outline form. One of ordinary skill in the art would recongize that the actual data structure would be a data file of a particular format different from the outline format of Table B0 and that skilled person would be able to perform the corresponding data structure.

TABLE A0

Rate Chart

| Weight (lbs) | Rate ($) |
|---|---|
| 1 | 5 |
| 2 | 5 |
| 3 | 5 |
| 4 | 5 |
| 5 | 5 |
| 6 | 5 |

TABLE B0

Rate Data Structure

I. Header
  A. number of subtables - 1
  B. number of expressions - 0
  C. expected input parameter - weight
  D. Rounding instructions for input parameters
II. Collection of expressions - none
  Collections of Subtables
  A. Subtable Header
  1. subtable type - Format Zero
  2. no. of entries - 1
  3. decimal position 2
  4. amount usage - in use
  5. amount size - 1
  6. key usage - not in use
  7. key size - 0
  8. min. charge usage - no
  9. min charge size - 0
  10. min. charge usage - no
  11. max charge size - 0
  B. Collection of entries
  1. Entry amount 500
  2. min. charge amount - none
  3. max. charge amount - none
  4. key value - none

TABLE C0

Rate Data Structure

I. Header
  A. number of subtables - 1
  B. number of expressions - 1
  C. expected input parameter - weight
  D. Rounding instructions for input parameters
II. Collection of expressions
  A. rate = weight × entry amount
III. Collection of Subtables
  A. Subtable Header
  1. subtable type - Format Zero
  2. no. of entries - 1
  3. decimal position 2
  4. amount usage - pointer to expression in section II. A.
  5. amount size - 1
  6. key usage - in use
  7. key size - 1
  8. min. charge usage - in use
  9. min charge size - 2
  10. min. charge usage - no
  11. max charge size - 0
  B. Collection of entries TABLE C0-continued Rate Data Structure 1. Entry One
  a. Key amount - 10
  b. Entry amount - 35
  c. Minimum amount - 300
  d. Maximum amount - none
  2. Entry Two
  a. Key amount - 20
  b. Entry amount - 30
  c. Minimum amount 400
  d. Maximum amount - none
  3. Entry Three
  a. Key amount - 30
  b. Entry amount - 25
  c. Minimum amount 800
  d. Maximum amount - none The calculation of a rate with the rate data structure with a Format Zero subtable of Table B0 outlined above would proceed as follows. A user would input a rate data structure name corresponding to the above rate data structure, a date of shipment and a weight (input parameter), for example, 3 lbs., into the carrier manager system 410. The rate data structure would be retrieved from memory and the rate data structure header would be read and decoded. The input parameter would be verified as to whether it corresponded to an expected input parameter. The input parameter would be rounded. The header indicates that there is one entry and that the entry should be obtained from the collection of entries. A decimal would be placed in the entry in accordance with the subtable header. The rate of $5.00 is then sent to the carrier manager system where it can be, for example, outputted, or saved.

The calculation of a rate with the rate data structure with a Format Zero subtable, Table C0, which represents a simple expression with a collection of entries, would proceed as follows. A user would input a rate data structure name corresponding to the above rate data structure, a date of shipment and a weight (input parameter), for example, 21 lbs., into the carrier manager system 410. The rate data structure would be retrieved from memory and the rate data structure header would be read and decoded. The input parameter would be verified as to whether it corresponded to an expected input parameter. The input parameter would be rounded. The header indicates that there are three entries and that an appropriate entry, for example Entry Two (III. B. 2), corresponding to the input weight, should be obtained from the collection of entries. The entry amount of 30 (III. B. 2. B), corresponding to the weight of 21 lbs., would be obtained and used in the expression. The expression is rate=entry amount times weight. Thus, the calculated rate mantissa would be 21 times 30 equals 630. A decimal would be placed in the entry in accordance with the subtable header to get a rate of $6.30. Since minimum rates were stated in each entry, the calculated rate would next be compared to the minimum rate (II. B. 2. C) of $4.00 for Entry Two. The appropriate rate, $6.30, would then be sent to the carrier manager system where it can be, for example, outputted, or saved.

FORMAT ONE DATA STRUCTURE

A rate data structure with a Format One subtable represents a rate chart with rates and one parameter. The rate data structure with the Format One subtable, when appropriate, can represent a rate chart using mathematical expressions. For example, rate chart A1 is represented by data structure B1, shown for illustration purposes in outline format. The rate data structure of Table B1, with the Format Zero subtable, represents the rate chart of Table A1, with rates for a range of weights from 1–20 pounds, and comprises the following information (parentheticals in this description refer to Table B1): a data structure header (I) indicating that the data structure contains one Format One subtable (I. A), a number of mathematical expressions indicator (I. B) indicating that the data structure contains no expressions, information regarding the number and type of expected input parameters corresponding to the rate data structure subtable, in this example, an indicator indicating that one input parameter, weight, would be expected, a collection of expressions (II), containing no expressions, and a collection of subtables (III) containing one Format One subtable. The subtable comprises a subtable header (III. A) and a parameter control data block (III. B). The subtable header contains a subtable format indicator (III. A. 1) indicating that the suitable is a Format Zero, information regarding decimal placement in a rate (III. A. 2), value usage information (III. A. 3) which indicates whether a value is in use and value size information (III. A. 9) which indicates the size of the value in bytes. These values correspond to values in the subtable value control data block (III. C.). A comparison operator (III. A. 4), for use when searching the subtable for the weight corresponding to the input weight, a minimum charge (III. A. 6) and a maximum charge (III. A. 8), are also present in the subtable header. The parameter control data block (III. B) comprises a number of segments indicator (III. B. 1), segment of parameter information (III. B. 4 and III. B. 5), a segment flag (III. B. 2) indicating the linearity of the data contained in the flag and a segment size indicator (III. B. 3) indicating the size of the segment. Each segment contains a value control data block entries indicator (III. B. 4. i and III. B. 5. i), a maximum value indicating the maximum value of the entries (III. B. 4. ii) in the segment and a segment value control data block (III. B. 6) comprising segment parameter data information. Tables A1 contains an example of a one parameter rate chart and B1 contain below contains an example of data structure information illustrated in outline form and corresponding to Table B1. One of ordinary skill in the art would recognize that the actual data structure would be a data file of a particular format different from the outline format of Table B1 and that skilled person woould be able to perform the corresponding data structure.

TABLE A1

Rate Chart

| WEIGHT (lbs) | RATE ($) |
|---|---|
| 1 | .25 |
| 2 | .35 |
| 3 | .40 |
| 4 | .48 |
| 5 | .53 |
| 6 | .60 |
| 7 | .70 |
| 8 | .81 |
| 9 | .93 |
| 10 | .99 |
| 11–12 | 1.25 |
| 13–14 | 1.45 |
| 151–6 | 1.65 |
| 17–18 | 1.95 |
| 19–20 | 2.00 |

TABLE B1

Rate Data Structure

I. Header
- A. number of subtables - 1
- B. number of expressions - 0
- C. expected input parameter - weight
- D. Rounding instructions for input parameters - roundup II. Collection of expressions - none III. Collection of Subtables
- A. Subtable Header
  1. subtable type - Format One
  2. decimal position - 2
  3. value usage - in use
  4. comparison operator - less than or equal to
  5. min. charge usage - not in use
  6. min. charge amount - not in use
  7. max. charge usage - not in use
  8. max. charge amount - not in use
  9. value size - 2
- B. Parameter Control Data Block
  1. number of segments - 2
  2. segment flags - segment one - linear, segment two - linear
  3. entry size - 1
  4. segment one
     - i. number of value control data block entries 10
     - ii. maximum value 10
     - iii. segment type - linear
     - iv. start value - 1
     - v. increment - 1
  5. segment two
     - i. number of value control data block entries - 5
     - ii. maximum value - 20
  6. segment value control data block
     - i. number of entries - 2
     - ii. segment type - linear
     - iii. start - 12
     - iv. increment - 2
- C. Value control data block
  1. number of entries - 15
  2. linearity - nonlinear
  3. entries: 25 35 40 48 53 60 70 81 93 99 125 145 165 195 200

Figure 4A:
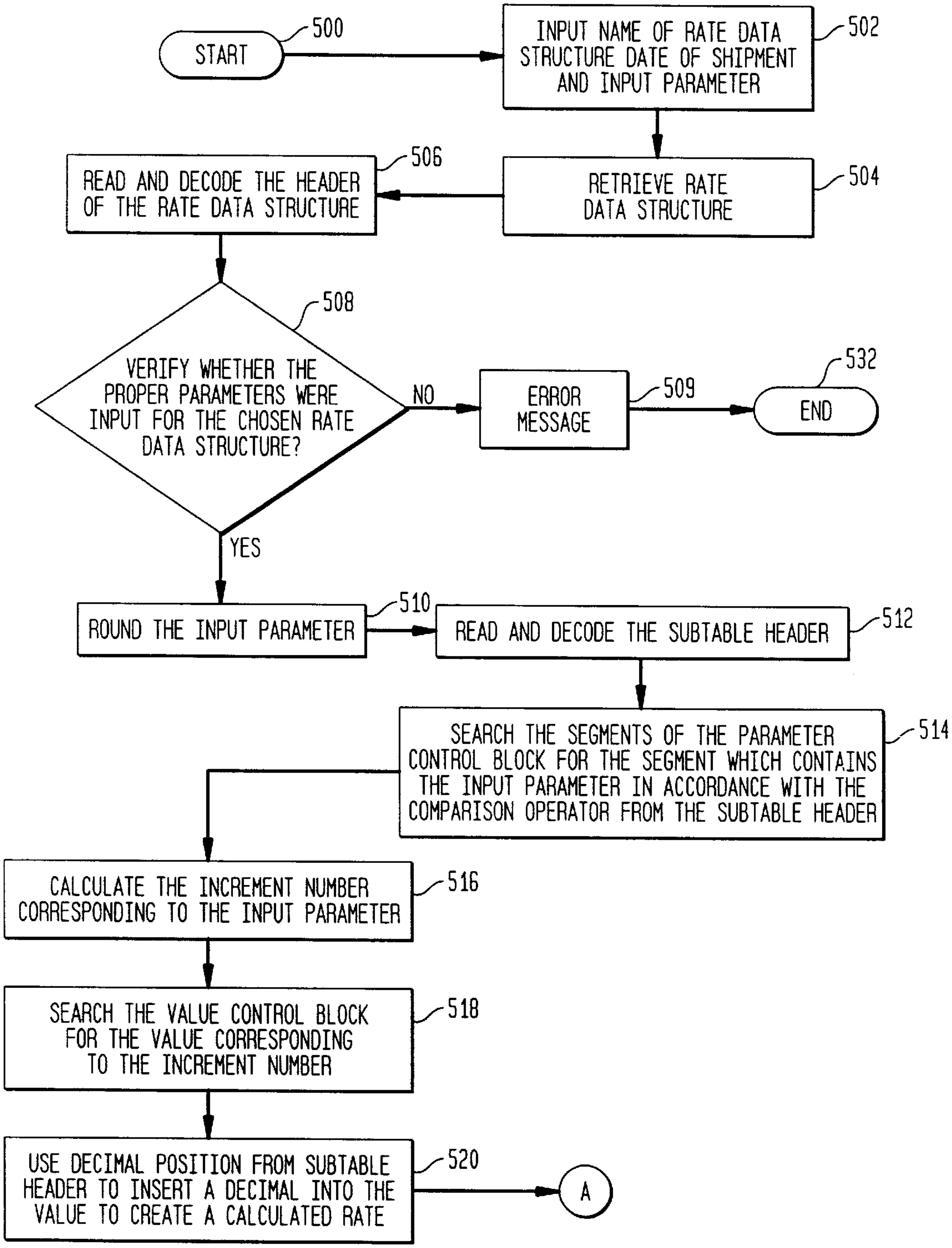
FIG. 4 is a flowchart of one embodiment of the present invention, wherein rates are calculated using platform independent rate data structure and wherein the rate data structure contains parameter information for one parameter and no expressions (Format One subtable with no expression).
Figure 4B:
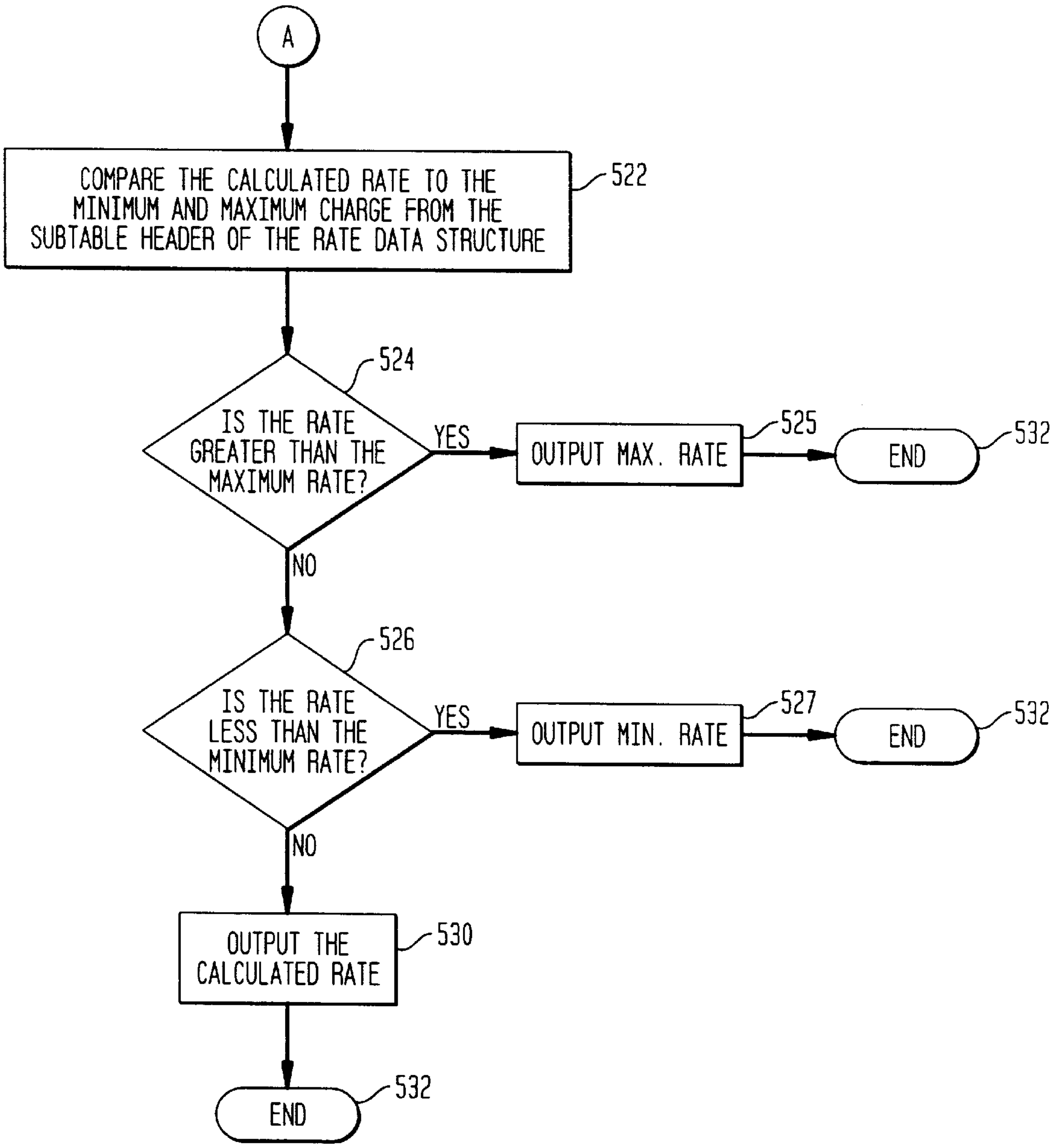
Figure 5A:
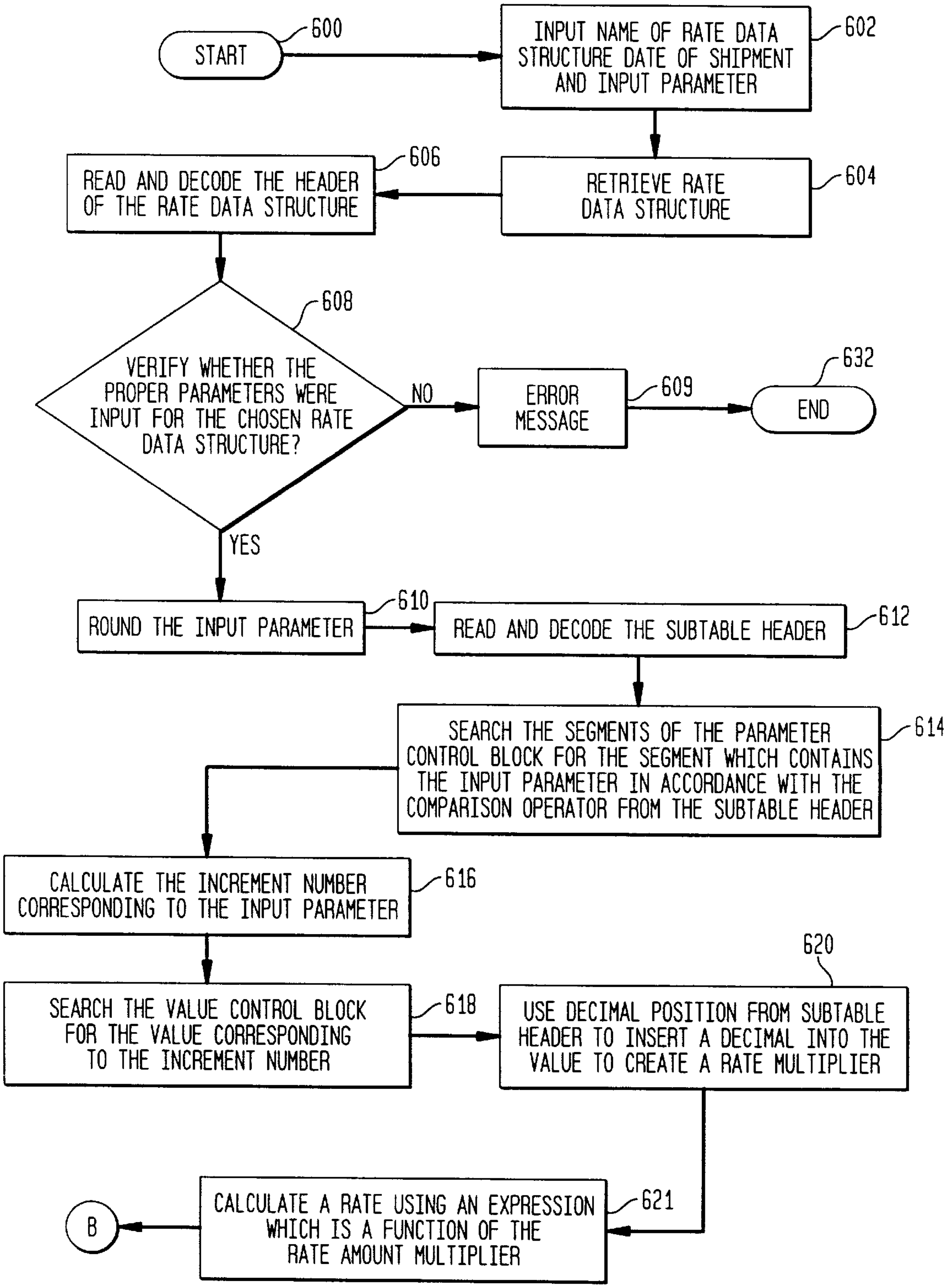
FIG. 5 is a flowchart of one embodiment of the present invention, wherein rates are calculated using platform independent rate data structure and wherein the rate data structure contains parameter information for one parameter and one expression (Format One subtable with one expression).
Figure 5B:
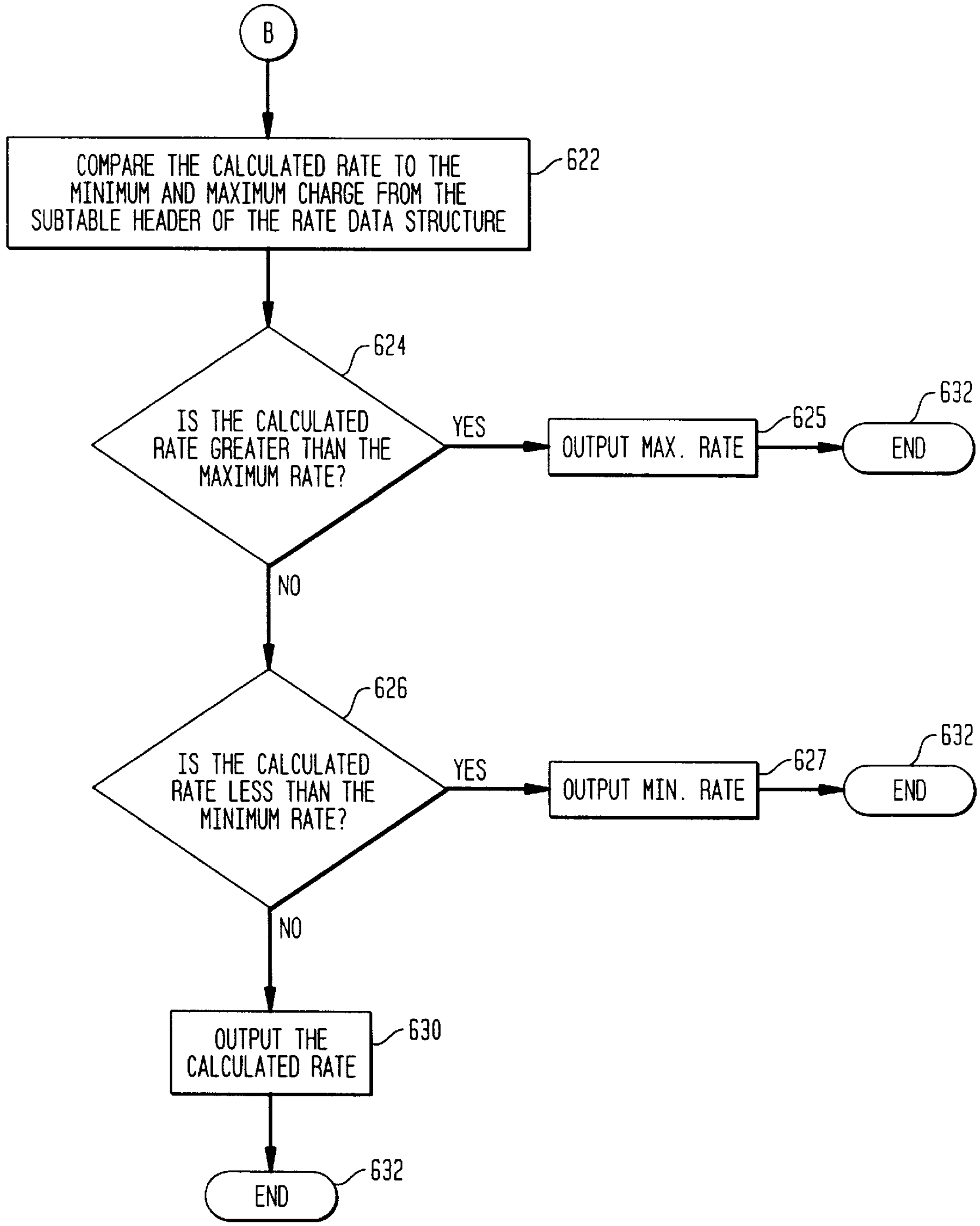

The calculation of a rate with the rate data structure with a Formiat One data structure outlined above in Table B1 would proceed as follows, and as set out in the flow chart of FIG. 4. At step 502, a user would input a rate data structure name corresponding to the rate data structure, a date of shipment and a weight (input parameter), for example 13.9 lbs., into the carrier manager system 410. At step 504, the rate data structure would be retrieved from memory and, at step 506, the rate data structure header would be read and decoded. The rate data structure header indicates that there is one Format One subtable and no expression(s), and, at step 508, the input parameter would be verified as to whether it corresponded to the expected input parameter, in this example, weight. If the input parameter was not proper, at step 509, an error message would be output or the software could request a proper input. In the case of a proper input parameter, at step 510, the input parameter would be rounded up to, in this example, 14 lbs., according to the rounding instructions (Table B1, I. D). At step 512, the subtable header is read and decoded and indicates that there is one Format One subtable, which comprises the subtable header, a key control data block containing two segments and a value control data block. At step 514, the segments of the parameter control data block are searched for the segment which contains the input parameter in accordance with the comparison operator, in the example, the less than or equal to operator (Table B1., III. A. 4). At step 516, an increment number is calculated corresponding to the input parameter. In the example, there are ten increments in the first segment (III. B. 4. i) and an additional two increments from the second segment, for a total of 12 increments that are counted in order to get to the weight value 14. Next, at step 518, the value control data block is searched for the 12th value which corresponds to the increment 12. That number is a rate mantissa of 145. At step 520, a decimal position corresponding to the instructions in the subtable header is inserted after the second numeral from the right in the rate mantissa to obtain a calculated rate of $1.45. In the above example, no minimum or maximum rates were stated in the subtable header. However, if a minimum and/or maximum rate was stated, the calculated rate would next be compared to the minimum and/or maximum rate in accordance with steps 522, 524 and 526 of FIG. 4. The appropriate rate is then sent to the carrier manager system where it can be, for example, outputted, or saved.

A similar method would be performed, for example, to calculate a rate using a Format One data structure which has one expression. The difference would be that the data structure of Table B1 would indicate in the subtable header that one expression is contained in the data structure and the collection or expressions would (Table B1, III) contain an expression, for example, rate equals calculated rate times the rounded input parameter (rate=calculated rate times rounded input). Note that, in an embodiment where there are one or more expressions, the header would indicate that an expression or expressions will be used and the value usage indicator indicates which expression(s). The steps for calculating the rate in accordance with this example are illustrated in the flow chart of FIG. 5 and explained as follows. At step 602, a user would input a rate data structure name corresponding to the rate data structure, a date of shipment and a weight (input parameter), for example 13.9 lbs., into the carrier manager system 410. At step 604, the rate data structure would be retrieved from memory and, at step 606, the rate data structure header would be read and decoded. The rate data structure header indicates that there is one Format One subtable and no expression(s), and, at step 608, the input parameter would be verified as to whether it corresponded to the expected input parameter, in this example, weight. If the input parameter was not proper, at step 609, an error message would be output or the software could request a proper input. In the case of a proper input parameter, at step 610, the input parameter would be rounded up to, in this example, 14 lbs., according to the rounding instructions (Table B1, I. D). At step 612, the subtable header is read and decoded and indicates that there is one Format One subtable, which comprises the subtable header, a key control data block containing two segments and a value control data block. At step 614, the segments of the parameter control data block are searched for the segment which contains the input parameter in accordance with the comparison operator, in the example, the less than or equal to operator (Table B1., III. A. 4). At step 616, an increment number is calculated corresponding to the input parameter. In the example, there are ten increments in the first segment (III. B. 4. i) and an additional two increments from the second segment, for a total of 12 increments that are counted in order to get to the weight value 14. Next, at step 618, the value control data block is searched for the $12^{th}$ value which corresponds to the increment 12. That number is a rate mantissa of 145. At step 620, a decimal position corresponding to the instructions in the subtable header is inserted after the second numeral from the right in the rate mantissa to obtain a rate multiplier of $1.45. At step 621, the rate is calculated using the expression from the collection of expressions. In this example, the expression is calculated rate equals rate multiplier times rounded weight (calculated rate=rate multiplier×rounded weight). The item with rounded weight of 14 lbs. has a calculated rate multiplier of $1.45. Weight and calculated rate multiplier are then used in the expression, such that the caculated rate=$1.45×14, or $20.30. In the example no minimum or maximun rates were stated in the subtable header. However, if a minimum and/or maximum rate was stated, the calculated rate would next be compared to the minimum and/or maximum rate in accordance with steps 622, 624 and 626 of FIG. 5. The appropriate rate is then sent to the carrier manager system where it can be, for example, outputted, or saved.

FORMAT TWO DATA STRUCTURE

A rate data structure containing a Format Two subtable represents a rate chart with rates and two parameter. Note that, the rate data structure with the Format Two subtable, when appropriate, can represent a rate chart using mathematical expressions. An example of a rate data structure with a Format Two subtable with no expressions is set out next and illustrated in Table B2. A corresponding rate data structure is illustrated in Table A2. The rate data structure with the Format Two subtable of Table B2 represents the rate chart of Table A2 with rates for a range of weights from 1–20 pounds comprises the following information (parentheticals in this description refer to Table B2): a data structure header (I) indicating that the data structure contains one Format Two subtable (I. A), a number of mathematical expressions indicator (I. B) indicating that the data structure contains no expressions, information regarding the number and type of expected input parameters (I. C) corresponding to the rate data structure subtable, in this example, an indicator indicating that two input parameters, weight and zone would be expected, a collection of expressions (III), containing no expressions and a collection of subtables (III) containing one Format Two subtable. The subtable comprises a subtable header (III. A) and a parameter control data block (III. B). The subtable header contains information regarding subtable format (III. A. 1), decimal placement in a rate (III. A. 2), value usage (III. A. 3) indicating value in use and value size information (III. A. 9) indicating the size of the value in bytes, and corresponding to values in the subtable value control data block (III. C). A comparison operator (III. A. 4) for use when searching the subtable for the weight corresponding to the input weight, a minimum charge (III. A. 6) and a maximum charge (III. A. 8) are also present in the subtable header. The parameter control data block (III. B) comprises a number of segments indicator (III. B. 1), two segments of parameter information (III. B. 4 and III. B. 5), a segment flag (III. B. 2) indicating the linearity of the data contained in the flag and a segment size indicator (III. B. 3) indicating the size of the segment. Each segment contains a value control data block entries indicator (III. B. 4. i and II. B. 5. i), a maximum value (III. B. 4. ii and III. B. 5. ii) indicating the maximum value of the entries in the segment and a segment value control data block (III. B. 6) comprising segment parameter data information. Tables A2 contains an example of a one parameter rate chart and B2 contain below containss an example of data structure information illustrated in outline form and corresponding to Table A2. One of ordinary skill in the art would recognize that the actual data structure would be a data file of a particular format different from the outline format of Table B2 and that skilled person would be able to perform the corresponding data structure.

TABLE A2

Rate Chart

| WEIGHT (lbs.) | Rate ($) Zone 1 | Rate ($) Zone 2 | Rate ($) Zone 3 |
|---|---|---|---|
| 1 | 1 | 2 | 25 |
| 2 | 3 | 7 | 35 |
| 3 | 5 | 18 | 50 |
| 4 | 7 | 19 | 48 |
| 5 | 9 | 20 | 53 |
| 6 | 11 | 25 | 60 |
| 7 | 12 | 26 | 70 |
| 8 | 13 | 27 | 91 |
| 9 | 14 | 28 | 125 |
| 10 | 15 | 44 | 135 |
| 12 | 16 | 50 | 140 |
| 14 | 17 | 75 | 145 |
| 16 | 18 | 101 | 205 |
| 18 | 24 | 128 | 215 |
| 20 | 25 | 132 | 225 |

TABLE B2

Rate Data Structure

I. Header
   A. number of subtables - 1
   B. number of expressions - 0
   C. expected input parameter - weight and zone
   D. Rounding instructions for input parameters - roundup
II. Collection of expressions - none
III. Collection of Subtables
   A. Subtable Header
      1. subtable type - Format Two
      2. decimal position - 2
      3. value usage - in use
      4. comparison operator - equals
      5. min. charge usage - not in use
      6. min. charge amount - not in use
      7. max. charge usage - not in use
      8. max. charge amount - not in use
      9. value size - 2
   B. Parameter control data block
      1. number of segments - 2
      2. segment flags - segment one - linear, segment two - linear
      3. entry size - 1
      4. segment one
         i. number of value control data block entries 10
         ii. maximum value 10
         iii. segment type - linear
         iv. start value - 1
         v. increment - 1
      5. segment two
         i. number of value control data block entries - 5
         ii. maximum value - 20
      6. segment value control data block
         i. number of entries - 2
         ii. segment type - linear
         iii. Start - 12
         iv. increment - 2
   C. Value control data block
      1. number of entries - 15
      2. linearity - nonlinear
      3. zone 1 entries 1 3 5 7 9 11 12 13 14 15 16 17 18 24 25
      4. zone 2 entries 2 7 18 19 20 25 26 27 28 44 50 75 101 128 132
      5. zone 3 entries: 25 35 50 48 53 60 70 91 125 135 140 145 215 225

Figure 6A:
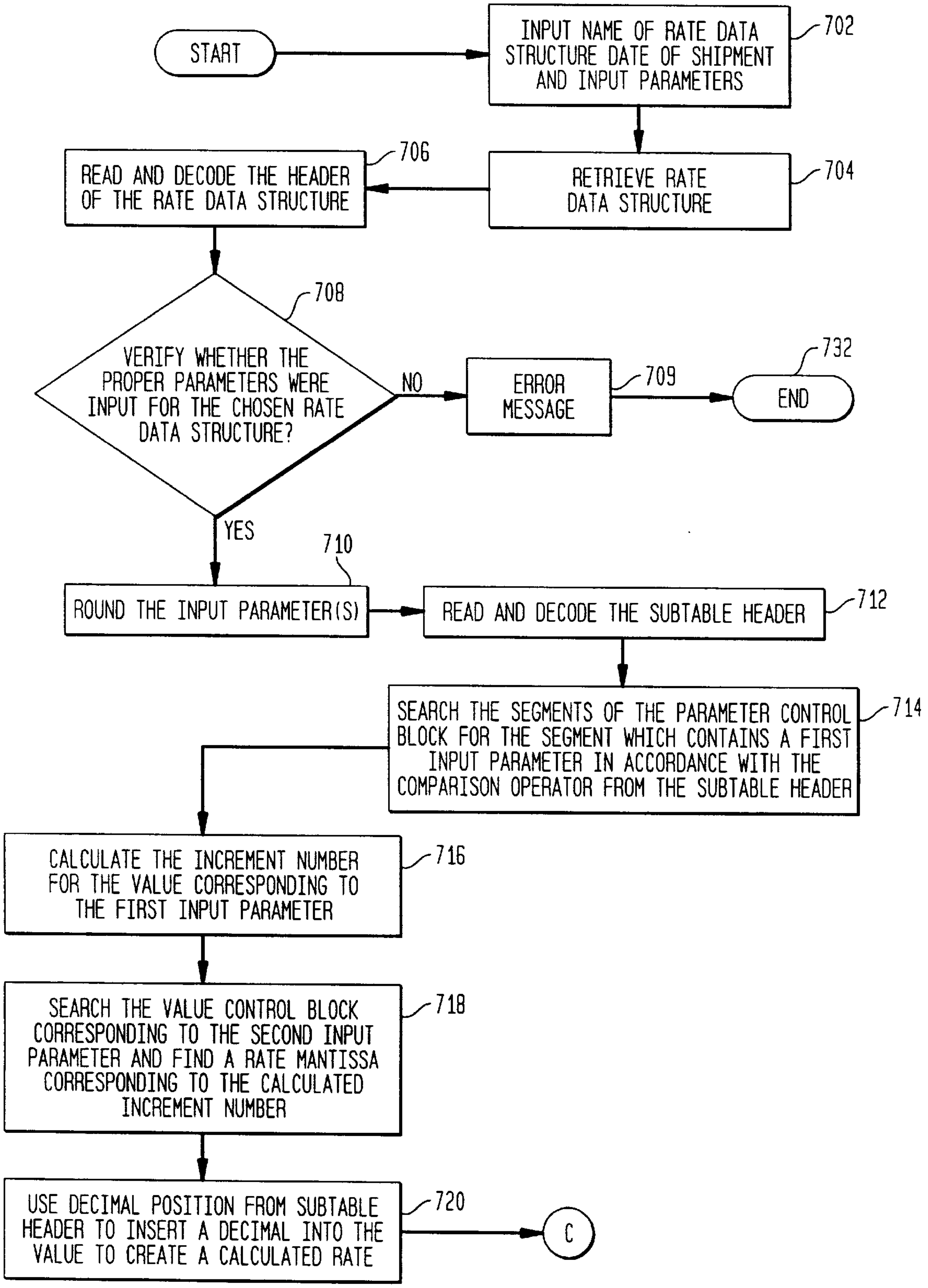
FIG. 6 is a flowchart of one embodiment of the present invention, is a flowchart of one embodiment of the present invention, wherein rates are calculated using platform independent rate data structure and wherein the rate data structure contains parameter information for two parameters and no expressions (Format Two subtable with no expressions).
Figure 6B:
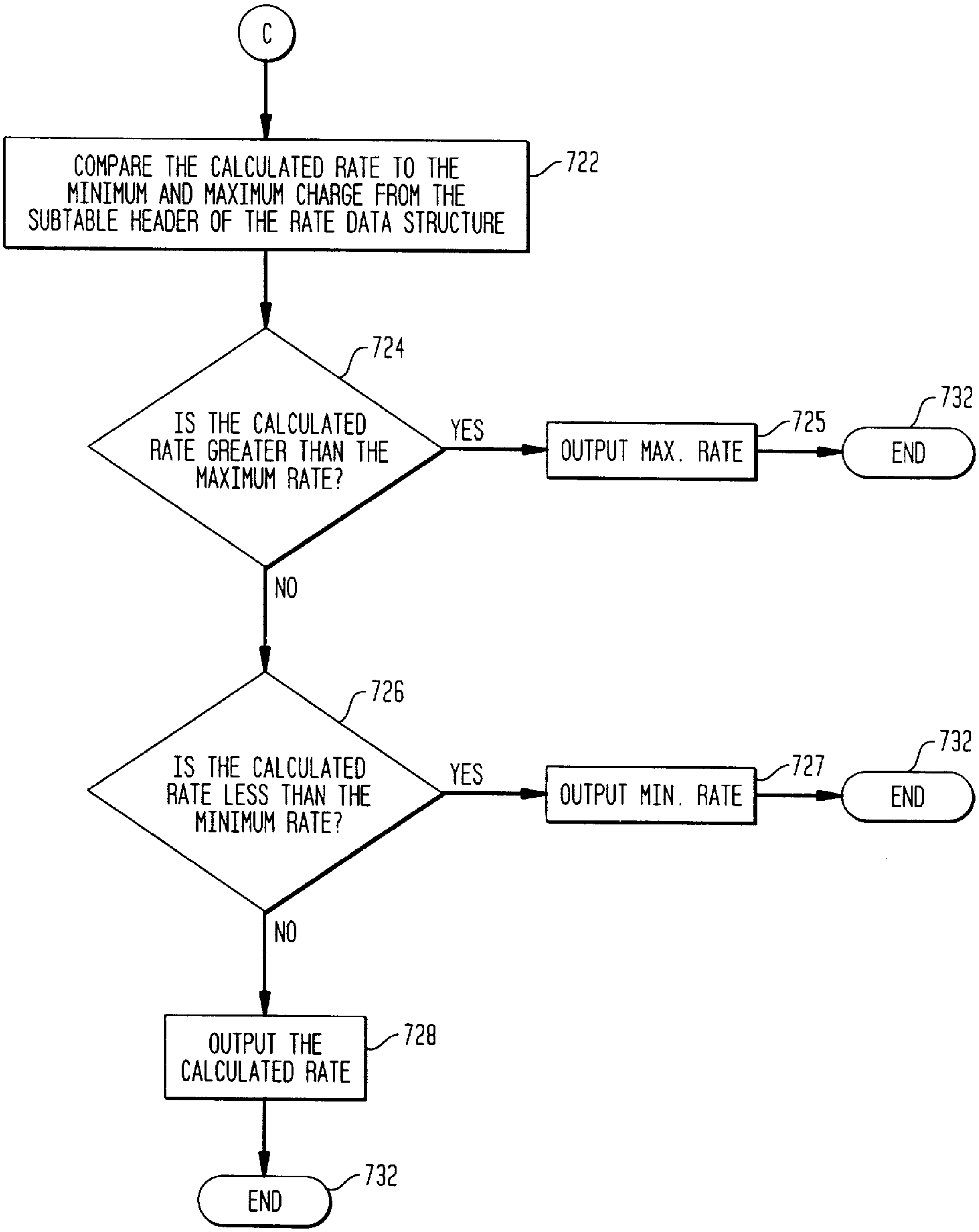

The calculation of a rate with the rate data structure with the Format Two subtable outlined above in Table B2 would proceed as follows and as set out in the flow chart of FIG. 6. At step 702, user would input a rate data structure name corresponding to the rate data structure data structure, a date of shipment, a weight and a delivery zone (input parameters), for example 13.9 lbs. and zone 3 into the carrier manager system 410. At step 704, the rate data structure would be retrieved from memory and, at step 706, the rate data structure header would be read and decoded. The rate data structure header indicates that there is one Format Two subtable and no expression(s) and, at step 708, the input parameters would be verified as to whether they corresponded to the expected input parameters, in this example, weight and zone. If the input parameters were not proper, at step 709, an error message would be output or the software would request a proper input. In the case of proper input parameters, at step 710, the is weight input parameter of 13.9 lbs. would be rounded up to, in this example, 14 lbs., according to rounding the instructions (Table B2, I. D.) in the header. At step 712, the subtable header is read and decoded and indicates that there is one Format Two subtable, which comprises the subtable header, a key control data block containing two segments and a value control data block. At step 714, the segments of the parameter control data block are searched for the segment which contains the first input parameter in accordance with the comparison operator, in the example, the equals operator (Table B2, III. A. 3). At step 716, an increment number is calculated corresponding to the first input parameter. In the example, there are ten increments in the first segment and an additional two increments from the second segment, for a total of 12 increments that are counted in order to get to the weight value 14. Next, at step 718, a value control data block corresponding to zone 3 is searched for the $12^{th}$ value which corresponds to the increment 12. That number is a rate mantissa of 145. At step 720, a decimal position corresponding to the instructions in the subtable header is inserted after the second numeral from the right in the rate mantissa to obtain a calculated rate of $1.45. In the above example, no minimum or maximum rates were stated in the subtable header. However, if a minimum and/or maximum rate was stated, the calculated rate would next be compared to the minimum and/or maximum rate in accordance with steps 722, 724 and 726 of FIG. 6. The appropriate rate is then sent to the carrier manager system where it can be, for example, outputted, or saved.

Figure 7A:
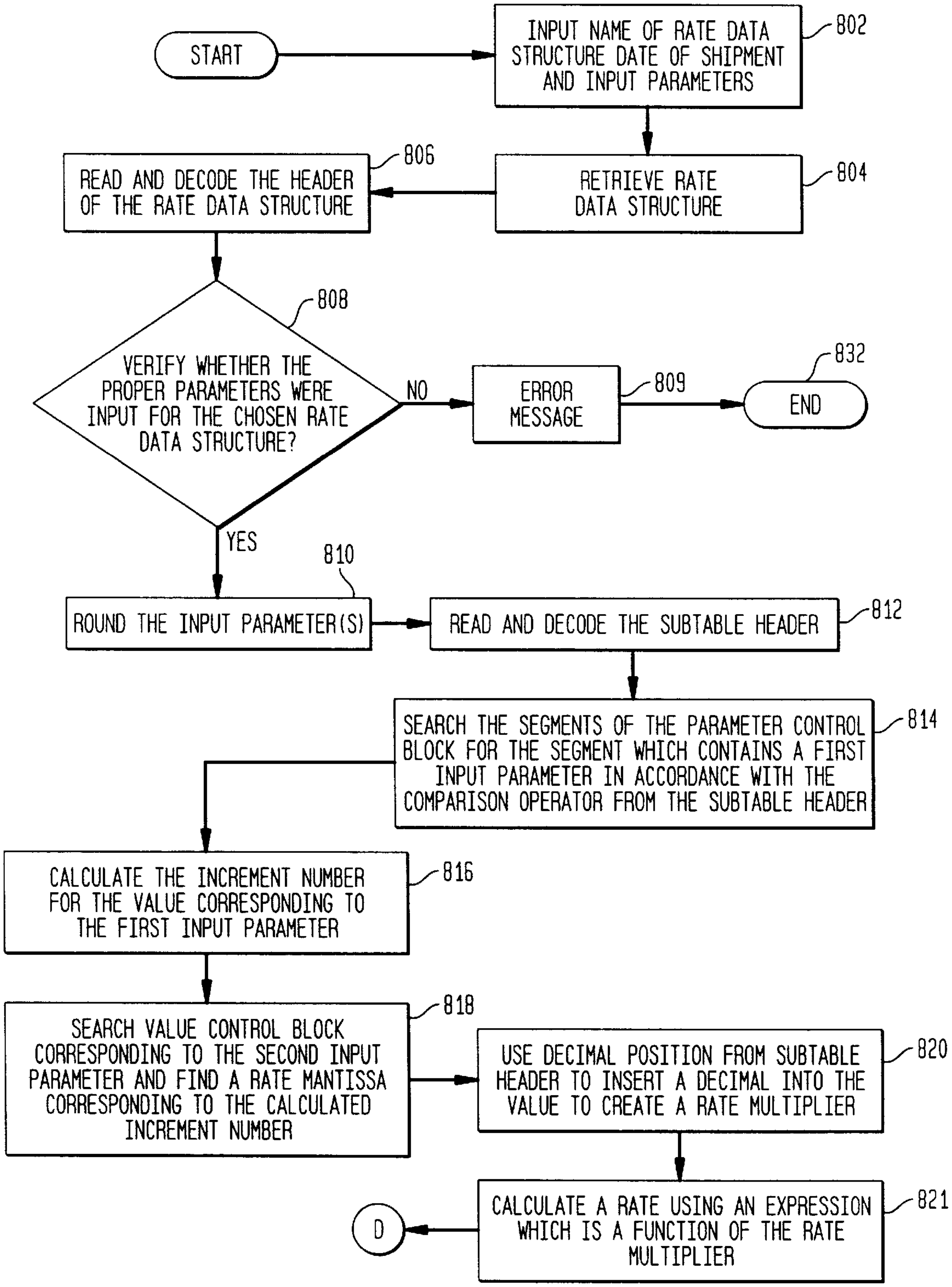
FIG. 7 is a flowchart of one embodiment of the present invention, wherein rates are calculated using platform independent rate data structure and wherein the rate data structure contains parameter information for two parameters and one expression (Format Two subtable with one expression).
Figure 7B:
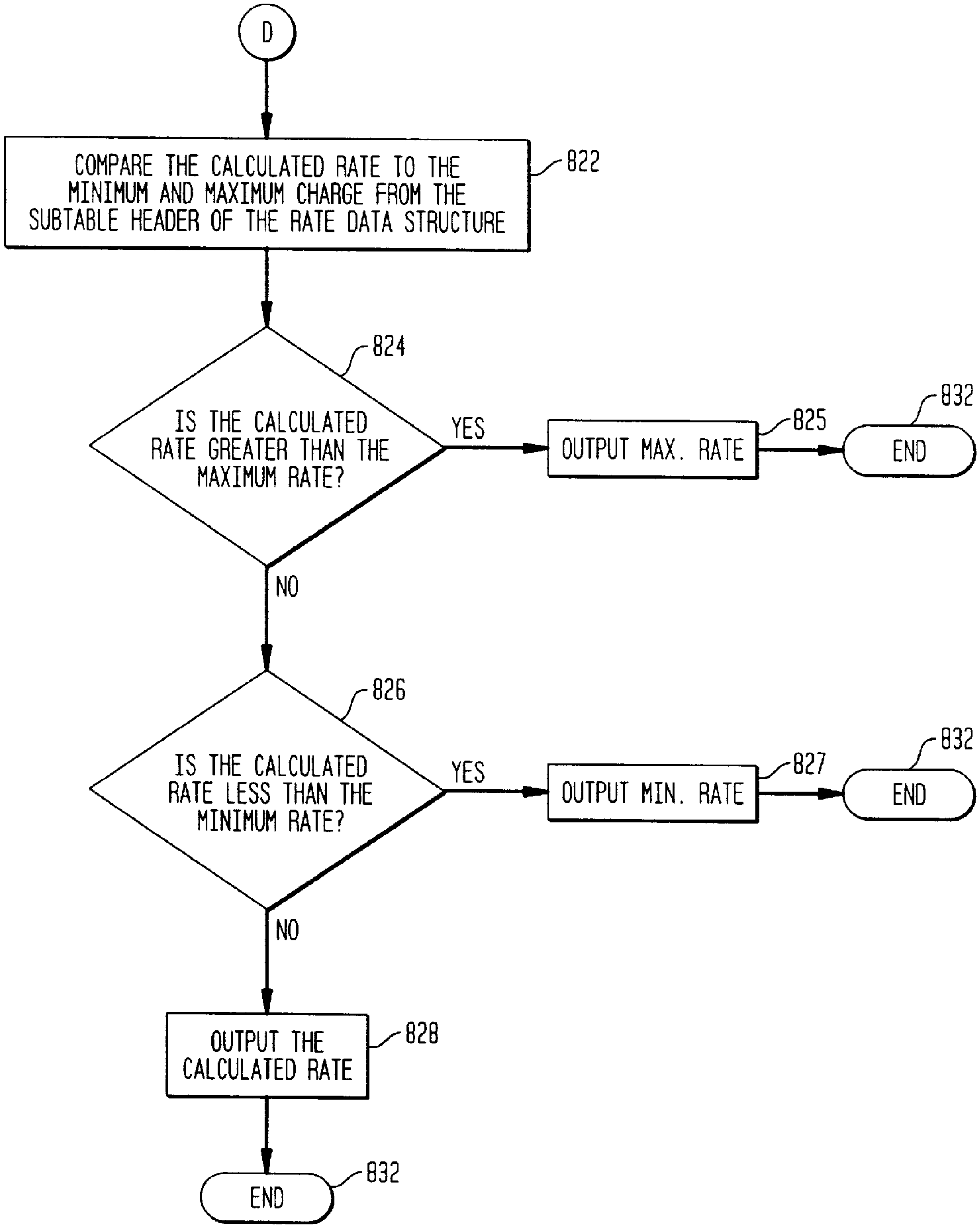

A similar method, set out in the flow chart of FIG. 7, would be performed, for example, to calculate a rate using a Forinat Two data structure which has one expression. The difference would be that the data structure of Table B2 would indicate in the subtable header that one expression is contained in the data structure and the collection or expressions (Table B2, III) would contain an expression, for example, rate equals calculated rate times the rounded input parameter (rate=calculated rate times rounded input). As in the example above, a 13.9 lb. item, rounded up to 14 lbs. has the calculated rate of $1.45 (with the decimal added to the rate mantissa); that value is then used in the expression, such that the calculated rate=$1.45×14 or $20.30. The steps for calculating the rate in accordance with the example are illustrated in flow chart format in FIG. 7, are described as follows. At step 802, user would input a rate data structure name corresponding to the rate data structure data structure, a date of shipment, a weight and a delivery zone (input parameters), for example 13.9 lbs. and zone 3 into the carrier manager system 410. At step 804, the rate data structure would be retrieved from memory and, at step 806, the rate data structure header would be read and decoded. The rate data structure header indicates that there is one Format Two subtable and no expression(s) and, at step 808, the input parameters would be verified as to whether they corresponded to the expected input parameters, in this example, weight and zone. If the input parameters were not proper, at step 809, an error message would be output or the software would request a proper input. In the case of proper input parameters, at step 810, the weight input parameter of 13.9 lbs. would be rounded up to, in this example, 14 lbs., according to rounding the instructions (Table B2, I. D.) in the header. At step 812, the subtable header is read and decoded and indicates that there is one Format Two subtable, which comprises the subtable header, a key control data block containing two segments and a value control data block. At step 814, the segments of the parameter control data block are searched for the segment which contains the first input parameter in accordance with the comparison operator, in the example, the equals operator (Table B2, III. A. 4). At step 816, an increment number is calculated corresponding to the first input parameter. In the example, there are ten increments in the first segment and an additional two increments from the second segment, for a total of 12 increments that are counted in order to get to the weight value 14. Next, at step 818, a value control data block corresponding to zone 3 is searched for the $12^{th}$ value which corresponds to the increment 12. That number is a rate mantissa of 145. At step 820, a decimal position corresponding to the instructions in the subtable header is inserted after the second numeral from the right in the rate mantissa to obtain a calculated rate of $1.45. In the above example, no minimum or maximum rates were stated in the subtable header. At step 821, the rate is calculated using the expression from the collection of expressions. In this example, the expression is calculated rate equals rate multiplier times rounded weight (calculated rate=rate multiplier times rounded weight). The item with rounded weight of 14 lbs. has a calculated rate multiplier of $1.45. Weight and calculated rate multiplier are then used in the expression, such that the calculated rate=$1.45×14, or $20.30. In the example, no minimum or maximum rates were stated in the subtable header. However if a minimum and/or maximum rate was stated, the calculated rate would next be compared to the minimum and/or maximum rate in accordance with steps 822, 824 and 826 of FIG. 7. The appropriate rate is then sent to the carrier manager system where it can be, for example, outputted, or saved.

A variety of information can be stored in the data structures and the data structures of the present invention are not limited to the information set out in the above examples. For example, different comparison operators may be used, such as equals, greater than or equal to, and less than or equal to. Also, the rounding may be performed as a round up, round down or round nearest function. The data structures can contain several expressions and several subtables each with a varying number of segments. The expressions may be a function of a constant, a dollar value and/or one or more input parameters. The operators in the expressions may be, for example, addition, subtraction, multiplication, division or percentage or any combination thereof. The number and type of expressions and subtables and the choice of comparison operators, arithmetic operators and rounding correspond to the rate chart which the data structure represents and can be determined by one of ordinary skill in the art.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

We claim:

1. A rate data structure for a carrier manager comprising:

(a) a rate data structure header containing information about the rate data structure and information about the functions of the rate data structure further comprising:
   (i) a number of subtables indicator for indicating the number of subtables in the rate data structure;
   (ii) a number of expressions indicator for indicating the number of expressions in the rate data structure; and
   (iii) information regarding number and type of expected input parameters corresponding to each subtable in the rate data structure; and (b) at least one subtable comprising:
   (i) a subtable header comprising information about the subtable and the information contained in the subtable;
   (ii) a parameter control data block comprising information corresponding to a parameter of the subtable; and
   (iii) a subtable value control data block comprising value information corresponding to a set of one or more rates;

whereby the rate data structure is platform independent.

2. The rate data structure claimed in claim 1, further comprising at least one expression for expressing rates.

3. The rate data structure claimed in claim 1, wherein at least one subtable further comprises a corresponding parameter control block comprising information corresponding to another parameter of the subtable.

4. The rate data structure claimed in claim 1 wherein the subtable header comprises:

(a) a subtable format indicator indicating the format of the subtable;

(b) information for decimal point placement in a rate;

(c) value usage and value size information corresponding to values in the subtable value control data block;

(d) comparison operators for use when searching for a subtable containing parameters corresponding to the input parameters;

(e) a minimum rate available from the subtable; and (f) a maximum rate available from the subtable.

5. The rate data structure claimed in claim 1, wherein the parameter control data block further comprises:

(a) a segment containing parameter information;

(b) a number of segments indicator for indicating the number of segments of parameter information that are contained in the subtable;

(c) a segment flag indicating linearity of the data contained in the segment; and (d) a size of segment indicator indicating the size of the segment.

6. The rate data structure claimed in claim 5, wherein the parameter information in the segment comprises:

(a) a number of entries indicator indicating the number of entries in the segment;

(b) a maximum number indicator indicating the maximum value of the entries in the segment; and (c) a segment value control data block comprising segment parameter data information.

7. The rate data structure as claimed in claim 6 wherein the segment value control data block parameter data comprises:

(a) a number of entries indicator indicating the number of entries in the segment value control data block; and (b) a segment flag indicating the linearity of entries in the segment value control data block.

8. The rate data structure as claimed in claim 7 wherein the segment value control data block parameter data further comprising:

(c) a start value indicating the starting value of the parameter information; and (d) an increment indicator indicating the increment of parameter information entries from the start value.

9. The rate data structure as claimed in claim 7 further comprising a set of entries where the number of entries in the set is equal to the number of entries indicator.

10. The rate data structure as claimed in claim 1 wherein the subtable value control data block comprises:

(a) a number of entries indicator indicating the number of entries in the subtable value control data block; and (b) a segment flag indicating the linearity of the entries in the segment value control data block.

11. The rate data structure as claimed in claim 10 wherein the subtable value control data block further comprising:

(c) a start value indicating the starting value of the entries in the subtable value control data block; and (d) an increment indicator indicating the increment of parameter information entries from the start value.

12. The rate data structure as claimed in claim 10 wherein the subtable value control data block further comprising a set of entries where the number of entries in the set is equal to the number of entries indicator.

13. The rate data structure as claimed in claim 3 wherein the corresponding parameter control data block further comprises:

(a) a set of values corresponding to another input parameter; and (b) a value string containing rate mantissas corresponding to the other input parameter.

14. A rate data structure for a carrier manager comprising:

(a) a header describing the content of the rate data structure further comprising:

(i) a length indicator indicating the length of the rate data structure;

(ii) a signature indicating that the data area comprises the rate data structure;

(iii) a table identifier identifying a the rate data structure;

(iv) at least one flag for describing a number of subtables in the data structure;

(v) offset value corresponding to each flag for identifying the location of a data area in the data structure; and (b) the data area for rate data comprising one or more subtables comprising data formats, the number of subtables corresponding to the flag in the header describing the number of subtables in the data structure;

whereby the rate data structure is platform independent.

15. The rate data structure claimed in claim 14, wherein at least one subtable comprises fixed rate values.

16. The rate data structure claimed in claim 14, wherein at least one subtable comprises information regarding one or more rate parameters.

17. The rate data structure as claimed in claim 14 wherein the data area further comprises a formula for expressing a rate.

18. An method of calculating a rate for a carrier manager comprising the steps of:

a) inputting a rate data structure name, a date of shipment and at least one input parameter into the carrier manager;

b) retrieving from memory a rate data structure corresponding to the rate data structure name, the date of shipment, and at least one input parameter, the rate data structure comprising a rate data structure header and at least one rate data structure subtable;

c) reading the rate data structure header, the rate data structure header comprising a number of subtables in the rate data structure, a number of expressions in the rate data structure, an expected input parameters indicator for the rate data structure, and a rounding instruction for rounding the input parameters;

d) decoding the rate data structure;

e) verifying whether each input parameter corresponds to the expected input parameter for the retrieved rate data structure;

f) rounding each input parameter in accordance with instructions in the rate data structure header;

g) reading the subtable header to obtain information regarding subtable format, decimal position, entry usage and entry of values in the rate data structure, comparison operator, minimum rate and maximum rate;

h) decoding the subtable header;

i) searching a subtable parameter control block comprising at least one segment, in order to find a segment containing a rate data structure parameter corresponding to an input parameter in a relationship defined by the subtable header comparison operator;

j) calculating the increment number corresponding to the input parameter;

k) searching a subtable value control block for a rate mantissa corresponding to the calculated increment number; and l) inserting a decimal into the rate mantissa to obtain a rate amount.

19. The method claimed in claim 18, further comprising the steps of:

m) comparing the rate amount to the minimum rate and the maximum rate in the subtable header to obtain the appropriate rate; and n) outputting the appropriate rate.

20. The method claimed in claim 19, wherein subsequent to step (a), the rate data structure name, date of shipment and at least one input parameter stored in an input/output data structure and the input/output data structure is transmitted to the rate data structure.

21. The method claimed in claim 20, wherein after step (m) and prior to step (n) the appropriate rate is stored in the input/output data structure and transmitted to the carrier manager.

22. The method claimed in claim 18, wherein the rate data structure retrieved in step (b) further comprises at least one expression.

23. The method claimed in claim 22, further comprising the steps of:

m) calculating a rate using an expression, which is a function of the rate amount, and input parameters;

n) comparing the calculated rate to the minimum rate and the maximum rate in the subtable header to obtain an appropriate rate; and o) outputting the appropriate rate.

24. An method of calculating a rate for a carrier manager comprising the steps of:

a) inputting a rate data structure name, a date of shipment and at least one input parameter into the carrier manager;

b) retrieving from memory a rate data structure corresponding to the rate data structure name, the date of shipment and at least one input parameter, the rate data structure comprising a rate data structure header and at least one rate data structure subtable;

c) reading the rate data structure header, the rate data structure header comprising a number of subtables in the rate data structure, a number of expressions in the rate data structure, an expected input parameters indicator for the rate data structure, and a rounding instruction for rounding the input parameters;

d) decoding the rate data structure header;

e) verifying whether each input parameter corresponds to the expected input parameter for the retrieved rate data structure;

f) rounding each input parameter in accordance with instructions in the rate data structure header;

g) reading the subtable header to obtain information regarding subtable format, decimal position, entry usage and entry of values in the rate data structure, comparison operator, minimum and maximum rate;

h) decoding the subtable header;

i) searching a subtable parameter control block comprising at least one segment, in order to find a segment containing a rate data structure parameter corresponding to the input parameter in a relationship defined by the subtable header comparison operator;

j) calculating the increment number corresponding to the input parameter;

k) searching a subtable value control block corresponding to another input parameter for a rate mantissa corresponding to the calculated increment number;

l) inserting a decimal into the rate mantissa to obtain a rate amount.

25. The method claimed in claim 24, further comprising the steps of:

m) comparing the rate amount to the minimum rate and the maximum rate in the subtable header to obtain the appropriate rate; and n) outputting the appropriate rate.

26. The method claimed in claim 24, wherein the rate data structure retrieved in step (b) further comprises at least one expression.

27. The method as claimed in claim 26 further comprising the steps of:

m) calculating a rate using an expression, which is a function of the rate amount, and input parameters;

n) comparing the calculated rate to the minimum rate and the maximum rate in the subtable header to obtain the appropriate rate; and o) outputting with the carrier manager system the appropriate rate.

28. The method claimed in claim 24, wherein subsequent to step (a) the rate data structure name, date of shipment and at least one input parameter stored in an input/output data structure and the input/output data structure is transmitted to the carrier rate calculation software.

29. The method as claimed in claim 25 wherein after step (n) and prior to step (o) the appropriate rate is stored in the input/output data structure and transmitted to the carrier manager.

30. A rate data structure containing information for calculating a rate in a carrier manager comprising:

A) a rate data structure header comprising:

a) a number of subtables indicator indicating that the rate data structure contains one subtable;

b) a number of expressions indicator indicating that the rate data structure contains no expressions;

c) information regarding number and type of expected input parameters corresponding to the rate data structure subtable;

B) a subtable comprising:

a) a subtable header comprising:

i) a subtable format indicator indicating the format of the subtable;

ii) a number of entries indicator;

iii) information for decimal placement in a rate;

iv) entry usage information; and v) entry size information;

b) an entry representing a rate mantissa and corresponding to the entry usage and entry size information contained in the subtable header.

31. A rate data structure containing information for calculating a rate in a carrier manager comprising:

A) a rate data structure header comprising:

a) a number of subtables indicator indicating that the rate data structure contains one subtable;

b) a number of expressions indicator indicating that the rate data structure contains one expression;

c) information regarding number and type of expected input parameters corresponding to the rate data structure subtable;

B) a subtable comprising:

a) a subtable header comp rising:

i) a subtable format indicator indicating the format of the subtable;

ii) a number of entries indicator;

iii) information for decimal placement in a rate;

iv) entry usage information; and v) entry size information; and b) an entry representing a rate mantissa multiplier and other information corresponding to the entry.

* * * * *